(12) United States Patent
Coquelle et al.

(10) Patent No.: US 12,109,787 B2
(45) Date of Patent: Oct. 8, 2024

(54) RIGID MULTILAYER DECORATIVE SURFACE COVERING

(71) Applicant: Tarkett GDL, Lentzweiler (LU)

(72) Inventors: Mathieu Coquelle, Wiltz (LU); Nicolas Boquillon, Wiltz (LU); Diego Gourdin, Wiltz (LU)

(73) Assignee: Tarkett GDL, Lentzweiler (LU)

(*) Notice: Subject to any disclaimer, the term of this patent is extended or adjusted under 35 U.S.C. 154(b) by 0 days.

(21) Appl. No.: 18/178,947

(22) Filed: Mar. 6, 2023

(65) Prior Publication Data
US 2023/0321961 A1 Oct. 12, 2023

(30) Foreign Application Priority Data

Apr. 12, 2022 (LU) .................................. 501834

(51) Int. Cl.
*B32B 27/30* (2006.01)
*B32B 5/30* (2006.01)
*B32B 27/22* (2006.01)
*B32B 37/10* (2006.01)

(52) U.S. Cl.
CPC .............. *B32B 27/304* (2013.01); *B32B 5/30* (2013.01); *B32B 27/22* (2013.01); *B32B 37/10* (2013.01); *B32B 2250/24* (2013.01); *B32B 2255/10* (2013.01); *B32B 2272/00* (2013.01); *B32B 2305/70* (2013.01); *B32B 2307/554* (2013.01); *B32B 2307/558* (2013.01); *B32B 2307/732* (2013.01); *B32B 2451/00* (2013.01)

(58) Field of Classification Search
None
See application file for complete search history.

(56) References Cited

U.S. PATENT DOCUMENTS

| | | | |
|---|---|---|---|
| 2017/0043558 A1* | 2/2017 | Park | B32B 27/30 |
| 2018/0044925 A1* | 2/2018 | Koh | B29C 48/0012 |
| 2019/0145109 A1* | 5/2019 | Esbelin | B32B 5/24 428/213 |
| 2021/0252738 A1* | 8/2021 | Van Vlassenrode | B32B 27/304 |
| 2021/0285231 A1* | 9/2021 | Baert | E04F 13/142 |

* cited by examiner

*Primary Examiner* — Ramsey Zacharia
(74) *Attorney, Agent, or Firm* — Fitch, Even, Tabin & Flannery LLP

(57) ABSTRACT

A rigid multilayer decorative surface covering is proposed. The surface covering has a thickness and comprises a sandwiched reinforcement composite layer comprising a thermoplastic polymer matrix having a top and a bottom surface, the sandwiched reinforcement composite layer comprising reinforcement layers on the top and bottom surfaces. The sandwiched reinforcement composite layer has a thickness comprised in the range from 25% to 85% of the thickness of the rigid decorative surface covering. A method for manufacturing the rigid multilayer decorative surface covering is also disclosed.

15 Claims, 5 Drawing Sheets

RIGID MULTILAYER DECORATIVE SURFACE COVERING

FIELD OF INVENTION

The present invention relates to a rigid multilayer decorative surface covering having a sandwiched reinforcement layer composite layer and a method for manufacturing the same.

BACKGROUND OF THE INVENTION

EP 3792053 relates to heterogeneous surface coverings manufactured on the basis of a thermoplastic material, preferably on the basis of polyvinyl chloride (PVC), and designed for covering floors, walls and other surfaces. Reinforcement layers are provided in the base layer and in the backing layer. According to EP 3792053, this allows for increasing the stiffness of the surface covering and, at the same time, preserving the flexibility sufficient for its operation.

GENERAL DESCRIPTION

A first aspect of the invention relates to a rigid multilayer decorative surface covering having a thickness. The surface covering comprises a sandwiched reinforcement composite layer comprising a thermoplastic polymer matrix having a top and a bottom surface. The sandwiched reinforcement composite layer comprises reinforcement layers, on the top and bottom surfaces (in other words, the reinforcement layers may form the top and bottom surfaces). The sandwiched reinforcement composite layer has a thickness comprised in the range from 25% to 85% of the thickness of the rigid decorative surface covering.

As used herein, the "thickness" of the rigid multilayer decorative surface covering is the span of the surface covering along the normal of the surface to be covered.

It will be appreciated that the specific arrangement of reinforcement fibres on the surfaces of the sandwiched reinforcement composite layer allows for improving the rigidity of the surface covering as well as improving thermal stability of the surface covering. These advantages are particularly appreciated in case an improved "look and feel" of the surface covering is wanted and also an improved durability of the surface covering (e.g. in commercial buildings where the surface covering may be exposed to sudden variation of temperature).

In addition, it will be appreciated that the sandwiched reinforcement composite layer allows for both increasing resistance to compression and traction of the surface covering.

As used in the present document, the bottom surface is the surface of the thermoplastic polymer matrix that is the closest to the surface to be covered by the surface covering when installed on site, relative to the top surface. Conversely, the top surface of the thermoplastic polymer matrix is the closest surface to the free surface of the surface covering when placed on the surface to be covered, relative to the bottom surface. This is also the case for any surface disclosed in the present document, e.g. the top and bottom surfaces of the reinforcement composite layer.

The surface covering may have a thickness comprised in the range from 3 mm to 10 mm, preferably from 3.2 mm to 7 mm, more preferably from 3.5 mm to 6 mm, even more preferably from 4 mm to 5 mm.

The thermoplastic matrix may comprise at least 55% by weight, preferably at least 65% by weight, more preferably of at least 75% by weight, even more preferably of at least 85% by weight of (mineral) filler. The thermoplastic matrix may comprise between 5% and 20% by weight, preferably between 6% and 15% by weight, even more preferably between 8% and 10% by weight of plasticizer. The thermoplastic matrix may be devoid of plasticizer (except possible traces), i.e. thermoplastic matrix may comprise between 0% and 2.5% by weight of plasticizer, preferably between 0% and 1% of plasticizer.

The sandwiched reinforcement composite layer may have a thickness comprised in the range from 30% to 75%, preferably from 35% to 70%, even more preferably from 35% to 68% of the thickness of the rigid decorative surface covering.

Each of the reinforcement layers may be fibre-based (i.e. be a fibre-reinforced layer), comprising (or consisting of) a woven or non-woven fibre material. Each of the reinforcement layers may comprise e.g. glass, PP, PET or unplasticized PVC (i.e. PVC without plasticizer). Of course, any combination thereof is contemplated.

Each of the reinforcement layers may be (individually, separately) selected in the group consisting of veils of glass fibres, nets of glass fibres, fleeces of glass fibres, unplasticized PVC films or PET films.

In an embodiment, the reinforcement layers may have the same composition and/or thickness. In other embodiments, the reinforcement layers may have different composition and/or thickness.

The thermoplastic polymer matrix may comprise (or consist of) PVC (polyvinyl chloride), a copolymer made of VC (vinyl chloride) and VA (vinyl acetate), a copolymer made of VC and BA (butyl acrylate), or PVB. Preferably the thermoplastic polymer matrix comprises agglomerated granules. In an embodiment, at least part of the PVC is recycled PVC (e.g. the agglomerated granules are recycled PVC granules).

The thermoplastic polymer matrix may further comprise two or more (additional) reinforcement layers located in the core of thermoplastic polymer matrix. In a preferred embodiment, the two or more reinforcement layers are located between 40% and 70%, preferably between 45% and 67%, even more preferably between 50% and 65% of the thickness of the thermoplastic polymer matrix.

The decorative surface covering may comprise a decorative print on a top surface of the sandwiched reinforcement composite layer.

The decorative surface covering may also comprise a wear layer and optionally a topcoat.

The decorative surface covering may optionally comprise a protective layer on the bottom surface of the sandwiched reinforcement composite layer.

Also, the decorative surface covering may comprise a foamed layer for (directly) contacting a surface to be covered by the decorative surface covering.

In a preferred embodiment, the decorative surface covering is a rigid multilayer decorative wall or floor covering. Advantageously, the surface covering is a Luxury Vinyl Tile (LVT).

A second aspect of the invention relates to a method for manufacturing a rigid multilayer decorative surface covering according to the first aspect of the invention. The method comprises:
 providing a reinforcement layer;
 scattering thermoplastic resin on the reinforcement layer;

providing a second reinforcement layer on the scattered thermoplastic resin so as to form a stack of layers (the stack of layers comprising the reinforcement layer, the scattered thermoplastic resin and the second reinforcement layer);

heating and pressing the stack of layers so as to form the sandwiched reinforcement composite layer.

The thermoplastic resin may be in the form of powder or granules. Powder size may be typically the size of S-PVC grains (about 200 μm), whereas the granules size may be in a range from 0.5 to 3.0 mm. Preferably, the granules are smaller than the thickness of the sandwiched reinforcement composite layer.

The thermoplastic resin may be mixed with plasticizer, the (content of) plasticizer not exceeding 15% by weight of the surface covering. The amount of plasticizer is preferably comprised in the range from 5% to 13% by weight of the surface covering.

Alternatively, no plasticizer is mixed with the thermoplastic resin. Residual plasticizer may still be present in the final product e.g. in case recycled PVC (granules) is used, the residual plasticizer originating from the recycled PVC. In that case, the amount of plasticizer does not exceed 3% by weight of the thermoplastic resin.

In the present document, the verb "to comprise" and the expression "to be comprised of" are used as open transitional phrases meaning "to include" or "to consist at least of". Unless otherwise implied by context, the use of singular word form is intended to encompass the plural, except when the cardinal number "one" is used: "one" herein means "exactly one". Ordinal numbers ("first", "second", etc.) are used herein to differentiate between different instances of a generic object; no particular order, importance or hierarchy is intended to be implied by the use of these expressions. Furthermore, when plural instances of an object are referred to by ordinal numbers, this does not necessarily mean that no other instances of that object are present (unless this follows clearly from context).

BRIEF DESCRIPTION OF THE DRAWINGS

By way of example, preferred, non-limiting embodiments of the invention will now be described in detail with reference to the accompanying drawings, in which.

The reader's attention is drawn to the fact that the drawings are purely schematic and not to scale. Furthermore, for the sake of clarity, proportions between height, length and/or width may not have been represented correctly. In particular, the drawings do not necessarily show the thicknesses of the different layers in the right proportions.

DETAILED DESCRIPTION OF PREFERRED EMBODIMENTS OF THE INVENTION

It will be understood that the following description and the drawings to which it refers describe by way of example several embodiments of the proposed invention for illustration purposes. This description of preferred embodiments shall not limit the scope, nature or spirit of the claimed subject matter. The skilled person will appreciate that features of the different embodiments may be combined into further embodiments without departing from the scope of the present invention. Also, the fact that features are disclosed in combination in a specific embodiment or that features are disclosed within the same paragraph should not be construed as meaning that said features are inextricably linked.

Figure 1:
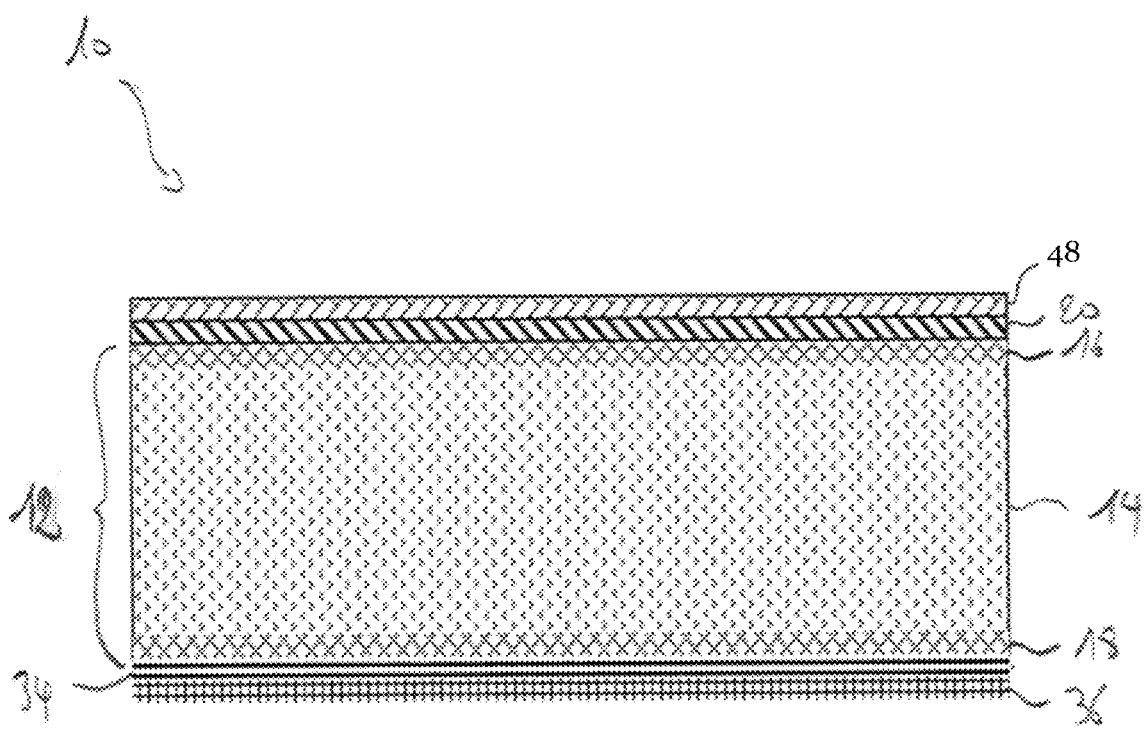
FIG. 1 is an illustration of a rigid multilayer decorative surface covering in accordance with an embodiment.

FIG. 1 illustrates a preferred embodiment of a rigid multilayer decorative surface covering 10 according to the present invention. The surface covering 10 comprises a sandwiched reinforcement composite layer 12 comprising a thermoplastic polymer matrix 14 having a top surface and a bottom surface on which reinforcement layers 16, 18 are provided. In other words, reinforcement layers 16, 18 are provided directly on the top and bottom surfaces.

The sandwiched reinforcement composite layer 12 forms the core of the surface covering 10. It provides structural stability to the surface covering 10. It has been discovered that providing reinforcement layers 16, 18 on the surfaces of the core layer (thereby forming the sandwiched reinforcement composite layer 12) allows for an improved structural stability, when compared to the prior art solutions in which the reinforcement layers are located in the core layer. As will become apparent from the below description and examples, surface coverings according to the present invention have an improved rigidity.

The thermoplastic matrix comprises PVC. In embodiments, thermoplastic matrix may be made of a copolymer such as VC-VA or VC-BA or comprise PVB.

The reinforcement layers 16, 18 may be fibre-based. The reinforcement layers may be made of woven or non-woven fibre material.

Each of the reinforcement layers may be (individually, separately) selected in the group consisting of veils of glass fibres, nets of glass fibres, fleeces of glass fibres, unplasticized PVC films or PET films.

The thermoplastic matrix may consist of at least 55% by weight, preferably at least 65% by weight, more preferably of at least 75% by weight, even more preferably of at least 85% by weight of (mineral) filler.

The reinforcement layers may have a thickness comprised in the range from 0.1 mm to 0.5 mm, preferably in the range from 0.2 mm to 0.4 mm. The thickness of the reinforcement layers may be the same or different.

The thermoplastic matrix may also comprise one or more (mineral) fillers, one or more thermal stabilizers, one or more processing aids and/or one or more impact modifiers.

Examples of fillers are calcium carbonate, clays, calcium silicate, calcium sulfate, calcium oxide, magnesium oxide, hydrated magnesium silicate (talc), titanium oxide, zinc oxide, alumino-silicates, dolomite, bauxite and silica, diatomaceous earth and molecular sieves.

Examples of plasticizers include phthalate-based plasticizers, such as, e.g., dioctyl phthalate (DOP), diisononyl phthalate (DINP), bis(2-ethylhexyl) phthalate (DEHP), etc., or other plasticizers, such as, e.g., terephthalates (for instance, di-(2-ethylhexyl) terephthalate (DEHT)), trimellitates, alkyl citrates, adipates, sebacates, benzoates, maleates, 1,2-cyclohexane dicarboxylic acid diisononyl ester (DINCH), etc. A preferred plasticizer is dioctyl terephthalate (DOTP). Examples of thermal stabilizers are metal compounds, particularly lead salts, organotin compounds, barium, cadmium and zinc salts and calcium/zinc stabilizers to provide stability during heat processing.

Examples of processing aids include stearic acid, metal stearates, petroleum waxes, silicon oil, mineral oil, synthetic oils and polyethylene waxes. Acrylic-based processing aids are preferred.

Examples of impact modifiers are methacrylate butadiene styrene (MBS) terpolymer, acrylate polymethacrylate copolymer (acrylic), chlorinated polyethylene (CPE), ethylene vinyl acetate copolymer (EVA), acrylonitrile butadiene styrene terpolymer (ABS). The sandwiched reinforcement composite layer 12 has a thickness comprised in the range from 25% to 85% of the thickness of the rigid decorative surface covering. In other embodiments, the sandwiched reinforcement composite layer 12 may have a thickness comprised in the range from 30% to 75%, preferably from 35% to 70%, even more preferably from 35% to 68% of the thickness of the rigid decorative surface covering.

Figure 2:
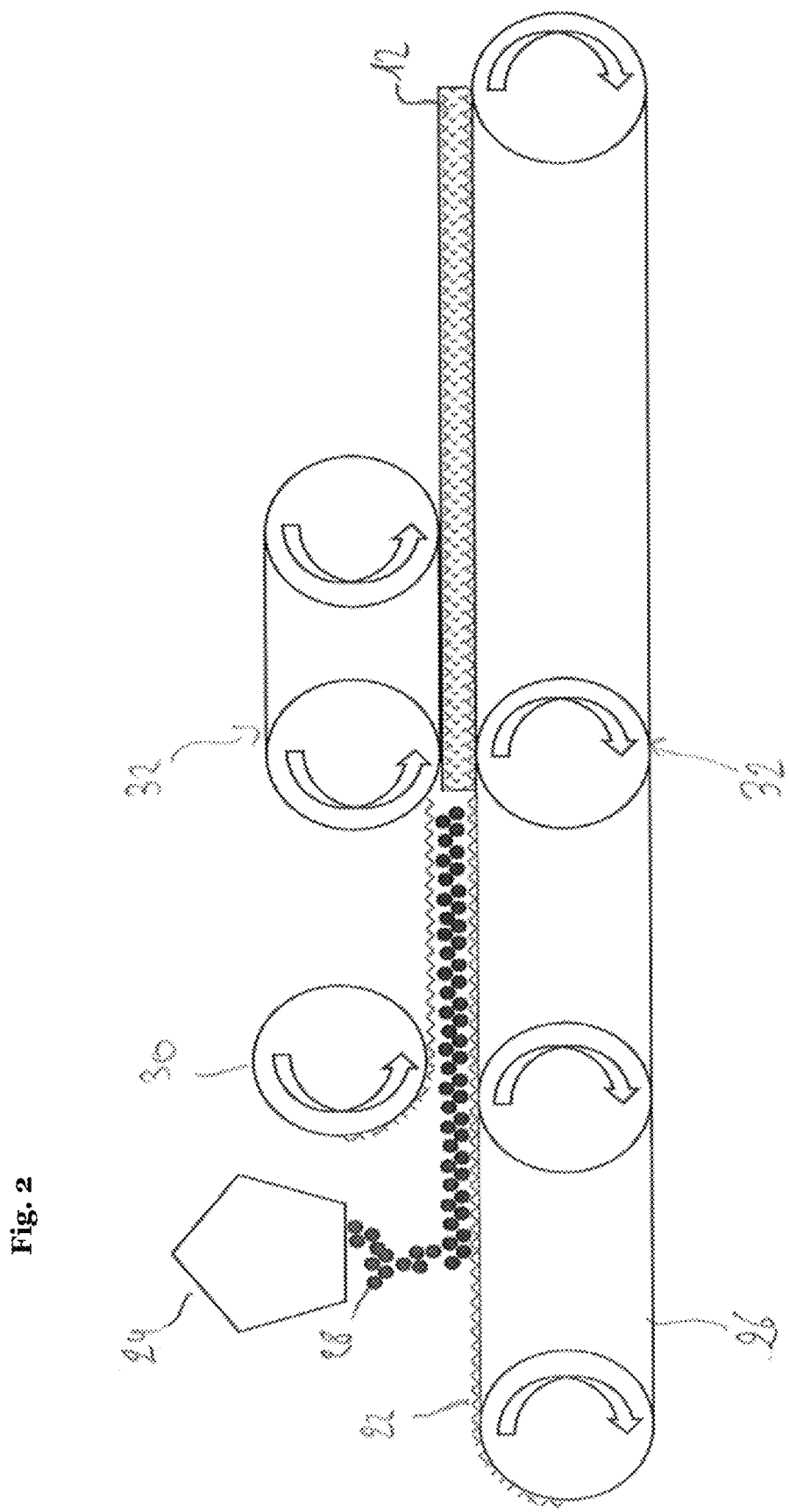
FIG. 2 is an illustration of a production line implementing a preferred embodiment of method for manufacturing a rigid multilayer decorative surface covering in accordance with an embodiment.

FIG. 2 illustrates a production line implementing a preferred embodiment of method for manufacturing a rigid multilayer decorative surface covering as described herein.

A first reinforcement layer 22 is provided on a belt 26.

A dispenser 24 scatters thermoplastic granules 28 on the reinforcement layer 22. The thermoplastic granules 28 may be made of PVC or a copolymer made of VC-VA or VC-BA or PVB. In an embodiment, at least part of the PVC granules are recycled PVC granules. In another embodiment, the granules are replaced by powders of the same components. Also, a combination of granules and powder is contemplated.

Downstream of the dispenser 24, a second reinforcement layer 22 is provided on the scattered granules 28 by a reinforcement layer unwinding unit 30. It should be noted that the first reinforcement layer 22 may also be provided on the belt 26 by another unwinding unit such as the unwinding unit 30.

At this stage, the thermoplastic granules 28 are sandwiched between the first and second reinforcement layers 22. Preferably, the granules are smaller than the desired thickness of the sandwiched reinforcement composite layer 12.

In a further step, the thermoplastic granules 28 sandwiched between the first and second reinforcement layers 22 are heated and pressed so as to form the sandwiched reinforcement composite layer 12. The thermoplastic matrix thus comprises agglomerated granules. As depicted in FIG. 2, the heating and pressing may be effected by a double belt press 32. The pressing is generally performed in a direction substantially parallel to the normal of the surface covering (i.e. perpendicular to the longitudinal direction of the layers of the surface covering). Such a double belt press may be the commercially available apparatus Thermofix®. Typical temperatures are comprised in the range from 160° C. to 220° C. and typical pressures are comprised in the range from 3.5 to 10 bars. In other embodiments, the thermoplastic polymer matrix may be produced by calendering or flat die extrusion process.

Figure 3:
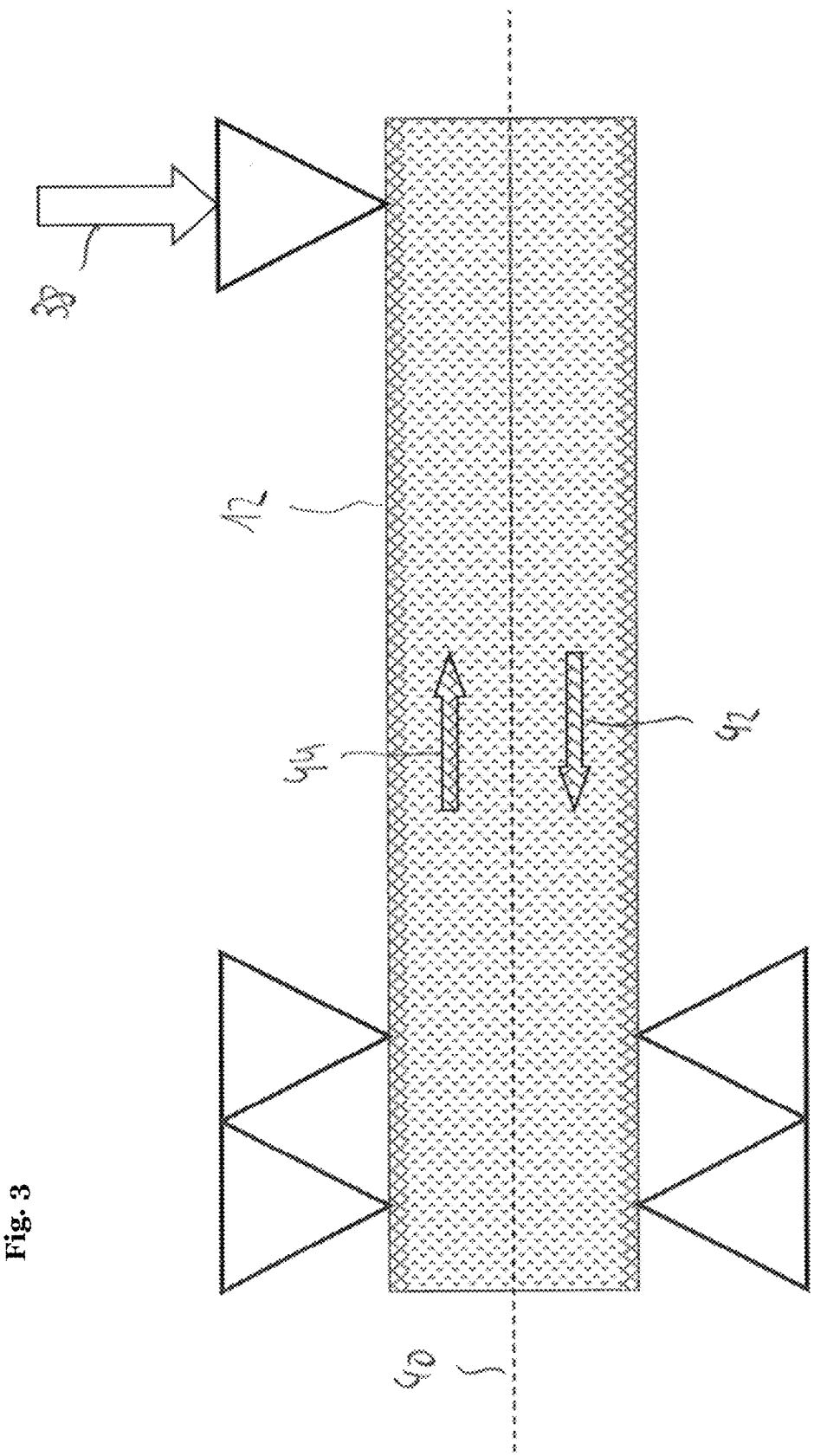
FIG. 3 is an illustration of a rigid multilayer decorative surface covering in accordance with an embodiment subject to a bending test.

The first and second reinforcement layers 22 are preferably sterically fixed to the thermoplastic matrix. In case fibre-based reinforcement layers are used, the fibres of the the first and second reinforcement layers 22 are mingled with the polymer chains of the thermoplastic matrix so that the reinforcement layers and the thermoplastic matrix are sterically fixed. With reference to FIG. 3 showing only the sandwiched reinforcement composite layer 12 for the sake of simplicity, the sandwiched reinforcement composite layer 12 provides the surface covering 10 with an outstanding resistance to bending. FIG. 3 show a typical bending test experiment where the left part of the surface covering is held in place and a force 38, normal to the upper surface of the surface covering, is applied. The force 38 effects a stress in the bulk of the surface covering, in particular it effects a compressive stress 42 in the part of the surface covering that is below the neutral plane 40 and it effects a tractive stress 44 in the part of the surface covering that is below the neutral plane 40. The surface covering as described herein offers outstanding resistance to such stresses. Indeed, the thermoplastic matrix offers a good resistance to compressive stress 42 while the first and second reinforcement layers 22 offer good resistance to tractive stress 44. It follows that the surface covering as described herein provides outstanding resistance to bending as well as to compression and/or traction (i.e. outstanding compressive strength and tensile strength). This, in turn, allows for an improved "look and feel" of the surface covering and also an improved durability. Thermal dilatation is also mitigated by the synergy between the reinforcement layers 22 and the thermoplastic matrix 14.

With reference to FIG. 1, a decorative printed layer 20 may be applied on top of the sandwiched reinforcement composite layer 12. The layer 20 is preferably digitally printed using digital printing equipment, which includes, advantageously, an industrial printer. The digital printing equipment preferably projects ink droplets onto the sandwiched reinforcement composite layer 12. Inks typically comprise one or more colorants, a binder that bonds the colorants to the surface and a carrier liquid. Colorants comprise dyes and/or pigments. Pigments are solid colorant particles that are suspended or dispersed in the carrier liquid. Pigment-based inks may be more lightstable and more fade-resistant than dye-based inks. Furthermore, dye-based inks often comprise organic solvents which may lead to higher VOC emissions than pigment-based inks, especially when water is the carrier liquid of the latter. Carrier liquids may include solvents, oil(s), water and polymeric resins. For certain surface coverings, radiation-curable inks may be considered as particularly advantageous.

Alternatively or additionally to the decorative printed layer, a décor layer may be applied (e.g. laminated) on the sandwiched reinforcement composite layer 12.

The decorative printed layer 20 or décor layer may have a thickness comprised in the range from 0.05 mm to 0.3 mm, preferably in the range from 0.1 mm to 0.2 mm.

Also, a wear layer 48 may be provided (e.g. on top of the printed layer and/or décor). The wear layer 48 may comprise a PVC layer, e.g. obtained from gelation and fusion of a PVC plastisol, or a calendered layer. In embodiments, the wear layer is PVC-free. In an embodiment, the wear layer is transparent or at least semi-transparent.

The wear layer 48 may have a thickness comprised in the range from 0.15 mm to 1 mm, preferably in the range from 0.2 mm to 0.8 mm and more preferably in the range from 0.2 mm to 0.6 mm.

In an embodiment, a topcoat may be provided (not depicted). The topcoat may be transparent or at least semi-transparent. In an embodiment, the topcoat may be a radiation curable polyurethane layer. A coater may be used for applying the radiation curable polyurethane composition and a UV source may be used for curing the radiation curable polyurethane composition, thereby forming the (cured) topcoat. The radiation curable polyurethane composition may be water-based. The topcoat may be arranged on top of the wear layer 48.

On the other side (bottom) of the sandwiched reinforcement composite layer 12, a protective layer 34 may be applied. The protective layer protects the bottom surface of the sandwiched reinforcement composite layer 12 e.g. from dust. Also, the protective layer allows for protecting the reinforcement layer during installation of the covering 10. The protective layer may be a polyurethane film.

Also, the rigid multilayer decorative surface covering 10 may comprise a foamed layer 36 as bottom-most layer for contacting the surface to be covered. The foamed layer 36 provides for improved acoustic isolation.

Figure 4:
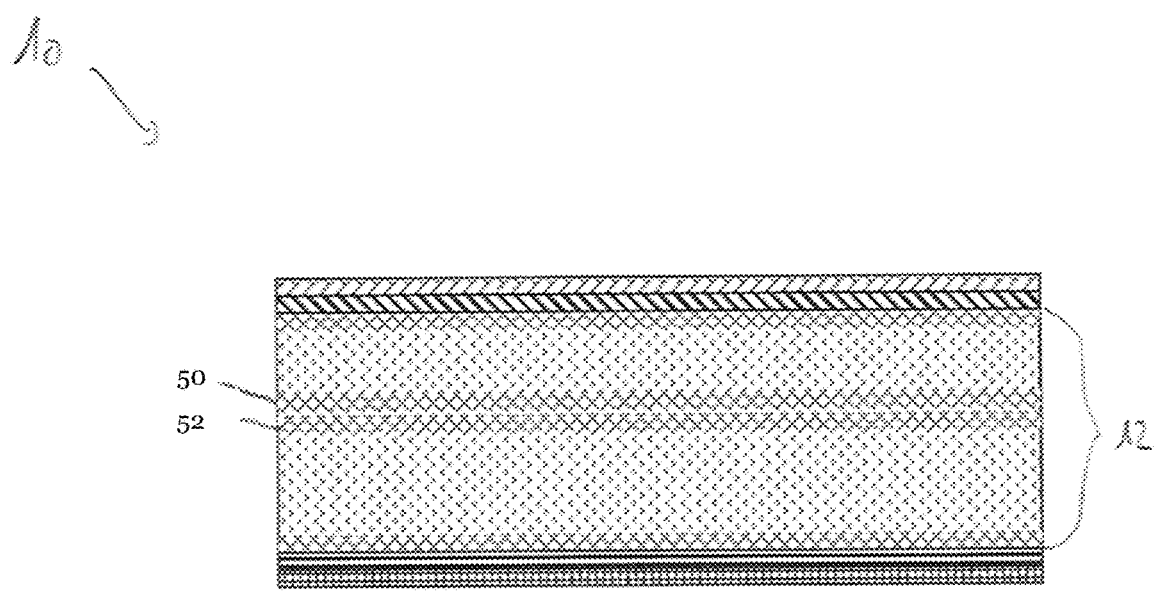
FIG. 4 is an illustration of a rigid multilayer decorative surface covering in accordance with an embodiment.

FIG. 4 shows a preferred embodiment of the invention. It differs from the embodiment depicted in FIG. 1 only in that two additional reinforcement layers 50, 52 are provided to the surface covering 10, in particular in (the core of) the thermoplastic matrix 14. There may be more than two additional reinforcement layers. Advantageously, the additional reinforcement layers 50, 52 are (vertically) located close (+/−15%, preferably +/−10%, even more preferably +/−5%) to the vertical center of the sandwiched reinforcement composite layer 12. In an embodiment, the two (or more) additional reinforcement layers are located at a vertical position comprised between 7/20 and 13/20, preferably between 8/20 and 12/20, even more preferably between 1/2 and 11/20 of the height of the thermoplastic polymer matrix 14, measured from the back surface of the thermoplastic polymer matrix 14 (i.e. the surface of the thermoplastic polymer matrix 14 facing the surface to be covered by the surface covering 10).

The additional reinforcement layers 50, 52 are preferably in (direct) contact with each other. The additional reinforcement layers 50, 52 may further improve the effect of the first and second reinforcement layers 22, in particular thermal stability of the surface covering.

In an embodiment, more than two additional reinforcement layers may be provided.

Figure 5:
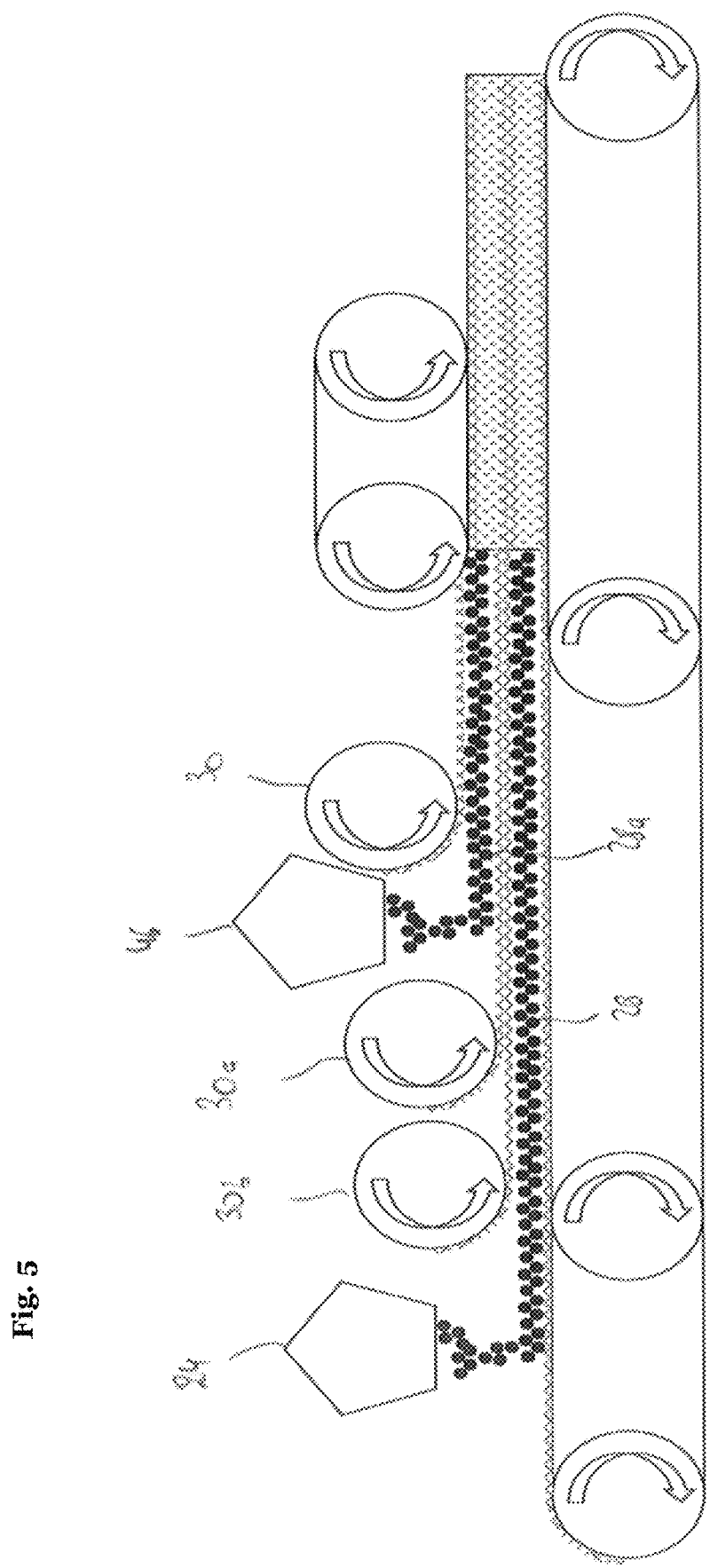
FIG. 5 is an illustration of a production line implementing a preferred embodiment of method for manufacturing a rigid multilayer decorative surface covering in accordance with an embodiment.

FIG. 5 show a production line implementing a preferred embodiment of a method for manufacturing a rigid multilayer decorative surface covering according to the embodiment depicted in FIG. 4. In particular, additional unwinding units 30a, 30b are provided between the dispenser 24 and the unwinding unit 30, for unwinding the additional reinforcement layers 50, 52. Also downstream from the unwinding units 30a, 30b and upstream from the unwinding unit 30, an additional dispenser 46 for scattering thermoplastic granules 28a on additional the topmost layer of the reinforcement layers 50, 52.

The surface covering may be cut into slabs and/or beveled. Connecting means may also be provided (e.g. tongues and grooves) so that surface coverings according to the present document may interconnect for covering the surface to be covered. Optionally, an adhesive layer may be provided on the bottom-most layer of the surface covering.

The surface covering may be a floor or wall covering. In a preferred embodiment, the surface covering is a LVT.

Examples of reinforcement layers that may be used with the present invention include plain glass scrim PVC known as 056G130D from James Dewhurst, Lumirror 10.91 PET film from Toray and/or glass veil U35/1 or U85 from Adfors.

EXAMPLES

The following illustrative examples are merely meant to exemplify the present invention but are not destined to limit or otherwise define the scope of the present invention.

Table 1 show an example composition (in % by weight) of a surface covering including according to the present invention. The exemplary surface covering comprises a wear layer, a decorative printed layer (e.g. printed by rotogravure) and a core layer (i.e. the thermoplastic polymer matrix).

TABLE 1

|  | Wear layer | Printed layer | Core layer |
| --- | --- | --- | --- |
| PVC | 74.7% | 37.5% | 29.9% |
| Filler | 0% | 41.5% | 59.8% |
| Plasticizer | 18.5% | 12.4% | 8.0% |
| ESBO | 3.4% | 1.3% | 1.5% |
| Thermal stabilizer | 1.9% | 1.3% | 0.4% |
| Processing Aid | 1.5% | 1.0% | 0.3% |
| Titanium dioxide | 0% | 5.0% | 0% |
| Carbon black | 0% | 0% | 0.030% |

In Table 1, KW 65 Vynova S6502 PVC is used for the wear layer, and KW 60 Vynova S6030 PVC is used for the thermoplastic polymer matrix. DOTP is used as plasticizer. The filler is Standard D from Jaslo. The thermal stabilizer is Baerostab CT 341P for the wear layer and Baerostab 27CP for the thermoplastic polymer matrix. eSBO is from Drapex HSE. The processing aid is LG PA 912.

The decorative printed layer is applied on the reinforced composite layer and the wear layer is applied on the decorative printed layer.

Another exemplary composition (in grams) of the thermoplastic polymer matrix is provided in Table 2, wherein no plasticizer is added. The wear layer and decorative printed layer composition remains unchanged.

TABLE 2

|  | Quantity (g) | Volume (cm$^3$) |
| --- | --- | --- |
| PVC | 100 | 71.4 |
| Stabilizer | 6 | 6 |
| Impact modifier | 6 | 5. |
| Filler | 50 | 18.5 |
| Processing aid | 6 | 5.5 |

The exemplary surface coverings comprise reinforcement layers as described in the present document. Said additional reinforcement layers may or may not be present depending on the application.

As a reference point, a comparative example (CE1) has been prepared. The surface covering has the same composition as the example but with two reinforcement layers located at the vertical center of the core layer.

A first exemplary surface covering (E1) is prepared, having a core layer composition as in Table 1 and two reinforcement layer sandwiching the core layer. A second exemplary surface covering (E2) is prepared, having a core layer composition as in Table 1 and two reinforcement layer sandwiching the core layer as well as two additional reinforcement layers located at the vertical center of the core layer.

All the surface coverings that are used for the below tests have a thickness of 5 mm.

The above examples and comparative examples of surfaces coverings are subjected to a deformation measurement as follows. A sample having dimensions of 160 mm×1000 mm is fixed in a horizontal position to a plate support so that exactly a 160×500 mm part of the sample is not supported by the plate support (i.e. is free of support). Due to gravity, the surface covering will bend where no support is provided.

The bending is recorded 30 seconds after removing means that prevent a deformation (bending) of the 16×500 mm part of the surface covering. The bending, being the angle, in degrees, between the horizontal position and the position after 30 seconds, of the extreme (farther away) bottom edge of the unsupported part of the surface covering. The deformation measurements are performed in an environment having a controlled temperature (23° C.) and a controlled relative humidity (50%). Prior art surface coverings (CE1) with thermoplastic polymer matrix made of plasticized PVC having a reinforcement layer in the bulk of the core layer will generally achieve at least 13° rigidity in the deformation measurements according to the above, whereas surface coverings according to the present invention (E1) achieve 7-8° rigidity according to the above deformation measurements. The additional reinforcement layers in the bulk (E2) even allow achieving a 6° rigidity or less.

In addition, a surface covering according to the present invention with a thermoplastic polymer matrix made of unplasticized PVC achieves between 2° and 3° rigidity (see Table 2).

Thermal expansion tests are performed and report an increased thermal stability. The tests are carried out with a dilatometer according to the following method. As a first step, the samples length is measured at 23° C. which provides the reference point. In a second step the samples are heated in a climate chamber for 6 hours at 80° C. In the third step, the samples are taken out of the chamber and the samples length is measured. This allows for determining the Coefficient of Linear Thermal Expansion (CLTE) between 23° C. and 60° C. Results are reported below.

TABLE 3

| | E1 | E2 | CE1 |
|---|---|---|---|
| CLTE (° C.$^{-1}$) | $3.95 \times 10^{-5}$ | $1.945 \times 10^{-5}$ | $2.31 \times 10^{-5}$ |

While specific embodiments have been described herein in detail, those skilled in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

The invention claimed is:

1. A rigid multilayer decorative surface covering having a thickness, the surface covering comprising a sandwiched reinforcement composite layer comprising a thermoplastic polymer matrix having a top and a bottom surface, the sandwiched reinforcement composite layer comprising reinforcement layers directly on the top and bottom surfaces, the sandwiched reinforcement composite layer having a thickness comprised in the range from 25% to 85% of the thickness of the rigid multilayer decorative surface covering, wherein the reinforcement layers comprise a woven, fiber material non-woven fiber material, glass or polypropylene, the thermoplastic matrix further comprising two additional reinforcement layers, the two additional reinforcement layers being vertically located at +/−15% relative to the vertical center of the sandwiched reinforcement composite layer.

2. The decorative surface covering as claimed in claim 1, wherein the sandwiched reinforcement composite layer has a thickness comprised in the range from 35% to 75% of the thickness of the rigid decorative surface covering.

3. The decorative surface covering as claimed in claim 1, wherein each of the reinforcement layers are selected from the group consisting of veils of glass fibers, nets of glass fibers, and fleeces of glass fibers.

4. The decorative surface covering as claimed in claim 1, wherein the thermoplastic polymer matrix comprises polyvinyl chloride, a copolymer comprising vinyl chloride and vinyl acetate, a copolymer comprising vinyl chloride and butyl acrylate or polyvinyl butyral.

5. The decorative surface covering as claimed in claim 4, wherein the polyvinyl chloride, the copolymer comprising vinyl chloride and vinyl acetate, the copolymer comprising vinyl chloride and butyl acrylate or the polyvinyl butyral is in the form of agglomerated granules.

6. The decorative surface covering as claimed in claim 1, wherein the thermoplastic polymer matrix comprises recycled polyvinyl chloride.

7. The decorative surface covering as claimed in claim 1, further comprising a decorative print on a top surface of the sandwiched reinforcement composite layer.

8. The decorative surface covering as claimed in claim 1, further comprising a wear layer.

9. The decorative surface covering as claimed in claim 8, further comprising a topcoat.

10. The decorative surface covering as claimed in claim 1, further comprising a protective layer on the bottom surface of the sandwiched reinforcement composite layer.

11. The decorative surface covering as claimed in claim 1, further comprising a foamed layer for contacting a surface to be covered by the decorative surface covering.

12. The decorative surface covering as claimed in claim 1, wherein the decorative surface covering is a rigid multilayer decorative wall or floor covering.

13. A method for manufacturing a rigid multilayer decorative surface covering as claimed in claim 1, comprising:
 a) providing a reinforcement layer;
 b) scattering thermoplastic resin on the reinforcement layer of step a);
 c) providing two additional reinforcement layers on the scattered thermoplastic resin of step b);
 d) scattering thermoplastic resin on a top surface of the two additional reinforcement layers of step c);
 e) providing a second reinforcement layer on the scattered thermoplastic resin of step d) so as to form a stack of layers; and
 f) heating and pressing the stack of layers so as to form the sandwiched reinforcement composite layer, wherein the thermoplastic resin forms a thermoplastic polymer matrix.

14. The method as claimed in claim 13, wherein the thermoplastic resin is mixed with plasticizer, the plasticizer not exceeding 15% by weight of the surface covering.

15. The method as claimed in claim 13, wherein no plasticizer is mixed with the thermoplastic resin.

* * * * *